United States Patent [19]

Back

[11] Patent Number: 4,908,562
[45] Date of Patent: Mar. 13, 1990

[54] METHOD AND APPARATUS FOR CONTROLLING THE MAGNITUDE AND DIRECTION OF A CURRENT THROUGH A WINDING

[75] Inventor: Per Ingvar M. Back, Lidingö, Sweden

[73] Assignee: Telefonaktiebolaget L M Ericsson, Stockholm, Sweden

[21] Appl. No.: 287,273

[22] Filed: Dec. 21, 1988

[30] Foreign Application Priority Data

Dec. 21, 1987 [SE] Sweden .............................. 8705106

[51] Int. Cl.$^4$ ............................................... H02P 8/00
[52] U.S. Cl. .................................... 318/696; 318/685; 318/561
[58] Field of Search .......................... 318/696, 685, 561

[56] References Cited

U.S. PATENT DOCUMENTS

| | | |
|---|---|---|
| 4,306,181 | 12/1981 | Welburn . |
| 4,424,557 | 1/1984 | Steigerwald . |
| 4,563,619 | 1/1986 | Davis et al. . |
| 4,682,092 | 7/1987 | Pellegrino et al. . |
| 4,683,408 | 7/1987 | Inoue et al. ............... 318/685 |
| 4,710,686 | 12/1987 | Guzik ....................... 318/293 |
| 4,743,824 | 5/1988 | Andersson ................. 318/696 |

FOREIGN PATENT DOCUMENTS

0196543 10/1986 European Pat. Off. .
3438034 4/1986 Fed. Rep. of Germany .

*Primary Examiner*—William M. Shoop, Jr.
*Assistant Examiner*—Saul M. Bergmann
*Attorney, Agent, or Firm*—Burns, Doane, Swecker & Mathis

[57] ABSTRACT

The invention relates to a method and a controlling apparatus for controlling the magnitude and direction of a current (I) through a winding (L). The method and controlling apparatus are based on a drive circuit (TR$_1$, D$_1$, TR$_2$, D$_2$, TR$_3$, D$_3$, TR$_4$, D$_4$) which is controllable such as to enter into three different types of operational state. In a first type of operational state the current is normally increasing in magnitude. In a second type of operational state the current is normally decreasing in magnitude comparatively slowly. In a third type of operational state the current magnitude is normally decreased comparatively rapidly. When the drive circuit is in the first type of operational state it is controlled either to remain in this state or to change to the second type of operational state in response to the result of at least one comparison between the actual value of the current and a desired value (I*) carried out during the time the drive circuit was in the first type of operational state. When the drive circuit is in the third type of operational state it is controlled either to remain in this state or to change to the second type of operational state in response to the result of at least one comparison between the current actual value and a desired value carried out during the time the drive circuit was in the third type of operational state. The method and apparatus are primarily intended for microstepping a two-phase stepping motor with a permanent magnetized rotor.

11 Claims, 4 Drawing Sheets

METHOD AND APPARATUS FOR CONTROLLING THE MAGNITUDE AND DIRECTION OF A CURRENT THROUGH A WINDING

TECHNICAL FIELD

The present invention relates to the control of current through a winding. More specifically, the invention relates to a method and apparatus for controlling a current through a winding towards a variable desired value. A method and apparatus in accordance wth the invention is to advantage usable in microstepping of a two-phase stepping motor with a permanent-magnetized motor, the stator winding in the motor being supplied with energy by a DC source via a drive circuit, which drive circuit is controllable into at least three different types of operational state. However, the invention can also be applied to other, similar situations for controlling the magnitude and direction of a current through a winding, which winding is connected to an electrical energy source via a drive circuit, where the drive circuit is controllable into at least three different types of operational state.

BACKGROUND ART

In recent years, stepping motors which are based on old, well-known ideas have obtained extensive use in connection with the technical development of both motor design itself and its current supply. The basic principles for the stepping motor and its drive, as well as at least certain further developments are well-known to one skilled in the art and are therefore not described here. One not skilled in the art is referred to the book "STEPPING MOTORS: a Guide to Modern Theory and Practice" by P. P. Acarnley, published by Peter Peregrinius Ltd. for the Institution of Electrical Engineers as No. 19 in IEE Control Engineering Series.

Microstepping is a method well known to one skilled in the art for providing a stepping motor with greater resolution than full stepping. Microstepping is so well-known in conjunction with stepping motors that it should not be necessary to describe it here. Further references for one not skilled in the art are "Ministepping Motor Drives" by E. K. Pritchard, Proceedings of the Fifth Annual Symposium on Incremental Motion Control Systems and Devices, University of Ill.; TECHNOLOGY OF MICROSTEPPING; OEM DESIGN, October 1983, pp 69–71; and "Microstepping: Small Steps Turn Into Big Improvements" by E. Slingland, POWER CONVERSION INTERNATIONAL; October 1983, pp 20-25.

There are many drive circuits in the prior art for supplying current to stepping motors from voltage sources and controlling the phase currents through the stator windings. The basic principles for such drive circuits and such control are well-known to one skilled, in the art and are therefore not described here. One not skilled in the art is referred to such as the first and the last of the above-mentioned references. In microstepping a stepping motor, a current in a winding is to be controlled towards a variable desired value. The desired value can assume a plurality of different values and at least occasionally rapidly increase or rapidly decrease by successively assuming ever greater values or ever smaller values.

Certain known methods and controlling apparatus have not managed to control sufficiently accurately the stator current towards its desired value in certain operational cases. In certain cases the current has not decreased sufficiently rapidly in time with the desired value, and in other cases the current has oscillated heavily, alternating above and below the desired value so that an excessive current ripple has been obtained.

Problems have therefore occurred in the operation of stepping motors, particularly with high demands on speed, acceleration and retardation, in spite of modern motor design and modern drive circuits. The problems have taken the form of vibrations, dissonance and deviations between desired and actual positions. An invention aiming at the solution of, or at least the reduction of such problems in controlling current to a stator winding, particularly in conjunction with the microstepping of stepping motors, is described in the European patent application No. EP 0242344, the content of which is incorpated herein as a reference.

Expressed somewhat summarily and simplified, it could be said that a method in accordance with EP 0242344 is applicable in drive circuits which are controllable into at least three different operational states, normally signifying in a first state the maintenance or increase of the current, a second state with comparatively slow current decrease and a third state with comparatively rapid current decrease. Of a method in accordance with EP 242344 it could then be said in short that, inter alia, the time sequence of the desired value is sensed and that the possibility of using the third state in response to the result of the sensing is limited to certain sections of the desired value time sequence. There is thus obtained a better possibility of sufficiently rapidly and accurately regulating the current towards a varying desired value so that within reasonable limits the current has time to decrease or increase in time with rapidly decreasing or increasing desired values without excessive current ripple. Audible dissonance with vibrations, such as mechanical resonance from the motor and connected parts in the system, can be reduced or completely eliminated in certain operational cases. Furthermore, a higher speed can be achieved with the motor. In certain cases the motor attenuation can also be improved.

A controlling apparatus according to EP 0232344 includes, inter alia, sensing means for sensing the time sequence of the desired value and control restricting means adapted in response to the sensed time sequence of the desired value to limit the possibilities of controlling the drive circuits such as to enter into the third operational state. The control restricting means are also preferably arranged to restrict, in response to the sensed time sequence of the desired value, the possibilities of controlling the drive circuit into the second operational state.

According to the embodiments described in EP 0242344, a method and controlling apparatus according to EP 0242344 signify that solely or substantially the first and second operational states are utilized during the portions of the time sequence of the desired value when the absolute value of the value successively increases and at least the first and the third operational states, preferably the second also, are used during certain portions of the time sequence of the desired value when the absolute value of the latter successively decreases.

The different operational states of the drive circuit, and these can be more than three, are achieved according to EP 0242344 by controlling different combinations of current switches in the drive circuit into conducting and/or blocking states. The drive circuit can be, at least partially, of a conventional type and the three or more combinations of conductive and blocking states of these current switches can be of a type already known per se.

DISCLOSURE OF INVENTION

The method and apparatus according to EP 0242344 can function excellently, particularly if they are optimated for the operational case in question. By "operational case" is intended here supply voltage, motor load, winding inductance etc. On the other hand, if they are not optimated with regard to the operational case in question, they can function more poorly. The optimation of the method and apparatus according to EP 0242344 has been regarded as so time-consuming by some users that they have not bothered with it.

According to EP 0242344, the drive circuit is controlled into the second operational state when the current desired value has an absolute value falling below a reference value. This signifies certain advantages, but can also result in a certain amount of zero cross-over distortion in conjunction with the reversal of the direction of the current desired value.

The present invention can be said to be aimed at creating a method and apparatus for controlling a current through a winding, such as to result in substantially the same advantages as the methods and apparatus according to EP 0242344 but which do not need to be optimated in the same was as the latter. The invention is also aimed at eliminating or reducing zero cross-over distortion in conjunction with changes in current direction.

One object of the present invention is to create a method and apparatus for controlling current through a winding, preferably a stator winding in a stepping motor in conjunction with microstepping, said method and controlling apparatus being able to control the current against a varying desired value comparatively rapidly and accurately.

Another object of the present invention is to create a method and apparatus for controlling a current through a winding, preferably in conjunction with microstepping of a stepping motor, such as to utilize a DC voltage source and a drive circuit with three different types of operational state.

A further object of the present invention is to create a method and apparatus for controlling a current through a winding towards a desired value, which method and apparatus do not require sensing the time sequence of the desired value for utilizing three different types of operational state in a drive circuit for the control.

A still further object of the present invention is to create a method and apparatus for controlling the current through winding towards a desired value, preferably in conjunction with microstepping a stepping motor, such as not to include any comparison between the desired value and a settable reference value for the current, this reference value being independent of the current actual value and which is to be set differently according to the individual operational case.

What is distinguishing for a method in accordance with the invention and preferred embodiments thereof are disclosed in the following claims.

Somewhat simplified and summarily expressed, it couild be said that a method in accordance with the invention is applicable to windings which are connected to an electrical source of energy via a drive circuit, said drive circuit being able to assume at least three types of operational state. The drive circuit and the three types of operational state can be similar to, or agree with, the drive circuit and the types of operational state utilized according to EP 0242344.

The first type of operational state is utilized for increasing or possibly maintaining the current magnitude. Electrical energy is then transferred from the energy source to the winding via the drive circuit.

The second type of operational state is utilized for comparatively slowly decreasing or possibly almost maintaining the current magnitude. Suitably, in this type of operational state, no substantial amount of energy is transferred from the energy source to the winding via the drive circuit or vice versa.

The third type of operational state is utilized for comparatively rapidly decreasing the current magnitude. Suitably, in this type of operational state no substantial amount of energy is transferred from the energy source to the winding. On the other hand, it is here suitable to feed back a substantial amount of energy from the winding to the energy source via the drive circuit, at least when the current magnitude is sufficiently great.

What is distinguishing for a method in accordance with the present invention are the criteria applicable for controlling the drive circuit to change between the different types of operational state. Here, not only the instant magnitude of the current in relation to the desired value is of importance, but also what type of operational state the drive circuit is in at this occasion.

When the drive circuit is in the first type of operational state, the drive circuit is controlled so that in response to the result of at least one comparison between the current actual value and a desired value it either retains the first type of operational state or changes to the second type of operational state.

When the drive circuit is in the second type of operational state, the drive circuit is controlled such that in response to the result of at least one comparison between the current actual value and a desired value it either remains in the second type of operational state or changes to the first type, or to the third type of operational state.

When the drive circuit is in the third type of operational state, the drive circuit is controlled such that in response to the result of at least one comparison between the current actual value and a desired value it either retains the third type of operational state or changes to the second type of operational state.

Irrespective of the result of the comparison between the actual and desired values, the drive circuit is not controlled so that it changes directly from the first type of operational state to the third type or vice versa. For the drive circuit enter into the first type or into the third type of operational state there is required that at least one comparison between the actual value and the desired value is made when the drive circuit is in the second type of operational state.

Successive comparison results are preferably stored. Possible control of the drive circuit so that it changes from the second type of operational state to the first or third type is then performed in response to a later comparison result and also to an earlier comparison result. It is particularly advantageous here if the drive circuit is controlled to change from the second type of operational state to the first type if both the previous comparison result and the later comparison result show that the current has the right direction but is too small. In such a case the drive circuit should be controlled to change from the second type of operational state to the third type only if both the previously stored comparison result and the later comparison result have shown that the current either has the wrong direction or is too great.

According to a preferred embodiment, a plurality of substantially equidistant transition times are determined independent of the result of comparison between desired value and actual value. In response to the result of at least one comparison, the drive circuit is then controlled such as always to change from the second type of operational state to the first or third type in conjunction with the nearest following transition time. The drive circuit will thus not remain in the second operational state after the nearest following transition time.

According to another preferred embodiment, a substantially constant time interval is determined. In response to the result of at least one comparison the drive circuit is then controlled so that, where applicable, it changes from the second type of operational state to the first or third type when the drive circuit has been in the second type of operational state during a time substantially agreeing with an integer multiple of the time interval.

Distinguishing for an apparatus controlling a current through a winding in accordance with the invention and preferred embodiments thereof are apparent from the following claims.

A controlling apparatus in accordance with the invention includes a drive circuit for connecting the winding to an electrical energy source, preferably a DC source with approximately constant voltage. As mentioned, the drive circuit has at least three different types of operational state. The controlling apparatus also includes actual value means for sensing the current through the winding and forming an actual value representing the current. The controlling apparatus also includes comparison means for comparing the actual value with a desired value for the current. In addition the controlling apparatus includes control means for controlling the drive circuit into different types of operational state in response to the result of the comparison. At least the drive circuit and the actual value means and the comparison means can be of a kind known per se. What is primarily distinguishing for the controlling apparatus is how the control means controls the drive circuit such as to change between the different types of operational state. Here, it is not only the latest result of the comparison of the comparison means which is of importance, but also earlier comparison results of the comparison means, these earlier results having decided what type of operational state the drive circuit is in on the occasion in question.

When the drive circuit is in the first type of operational state, the control means control the drive circuit so that it either maintains the first type of operational state or changes to the second type in response to at least one comparison between the actual value and a desired value, the comparison means carrying out this comparison during the time the drive circuit is in the first type of operational state.

When the drive circuit is in the third type of operational state, the control means controls the drive circuit so that it either retains the third type of operational state or changes to the second type of operational state in response to at least one comparison between the actual value and a desired value, the comparison means carrying out this comparison during the time when the drive circuit is in the third type of operational state.

When the drive circuit is in the second type of operational state, the control means controls the drive circuit so that it changes to the first or the third type of operational state or maintains the second type in response to at least one comparison between the actual value and a desired value, the comparison means carrying out this comparison during the time the drive circuit is in the second type of operational state.

The controlling apparatus preferably includes memory means for storing the comparison results from the comparison means. The control means then control the drive circuit so that, in appropriate cases, it changes from the second type of operational state to the first or third type of operational state in response to a previous as well as a later comparison result made by the comparison means.

A preferred embodiment of the controlling apparatus includes time synchronizing means for determining a plurality of substantially equidistant transition times irrespective of the comparison result. The control means then control the drive circuit in response to the result of at least one comparison so that it always changes from the second type of operational state to the first or third type at the nearest following transition time determined by the time synchronizing means.

Another preferred embodiment of a controlling apparatus includes time interval setting means for determining a substantially constant time interval. In such a case, the control means are adapted to control the drive circuit in response to the result of at least one comparison so that it always changes from the second type of operational state to the first or third type when the drive circuit has been in the second type during a time substantially equally as long as an integer multiple of the time interval from the time interval setting means.

Implementing a method for controlling, or a regulating apparatus in accordance with the invention has several advantages. Three different types of operational state can be utilized in the control. In this way, there is a better opportunity of controlling the current towards a varying desired value than if only two operational state could be utilized. The current can thus be increased and decreased in time with rapidly increasing or rapidly decreasing desired values simultaneously as the current ripple will not be too great. In principle, all three types of operational state can be utilized both when the desired value increases as when it decreases. The time sequence of the desired value does not need to be sensed. Neither does the desired value need to be compared with any reference value independent of the current actual value, which reference value should be adapted to the individual operational case. Zero crossover distortion, i.e. the difference between the actual value of the current and its desired value in conjunction with changing current direction can be less than according to EP 0242344.

Further advantages will be understood by one skilled in the art after having studied the following description of preferred embodiments.

BEST MODES FOR CARRYING OUT THE INVENTION

Figure 1:
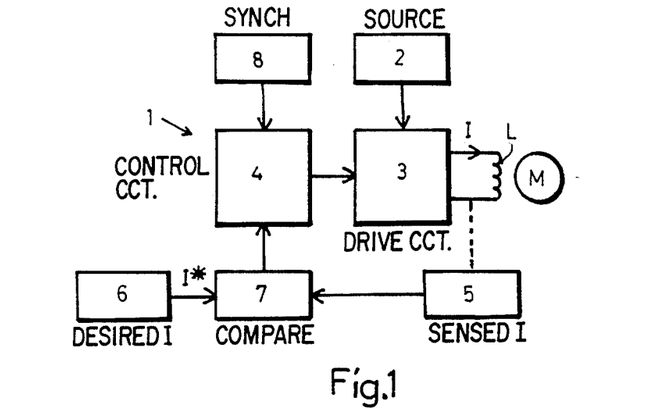
FIG. 1 is a block diagram of an embodiment of a controlling apparatus in accordancde with the invention.

An embodiment of a controlling apparatus in accordance with the invention is illustrated in FIG. 1 in the form of a somewhat simplified block diagram. The illustrated controlling apparatus 1 has the task of controlling the magnitude and direction of a current I through a winding L in a motor M so that the curren I follows a desired value I*, which can vary in time, e.g. according to FIGS. 3 and 4.

An electrical energy source 2 supplies the motor M and controlling apparatus 1. The controlling apparatus includes a drive circuit 3 for connecting the winding L to the energy source 2. The drive circuit is controllable into at least three different types of operational state, which will be described in connection with FIG. 2. The drive circuit 3 is connected to control means 4 for controlling the drive circuit such that it either maintains its operational state or changes to another type of operational state.

The controlling apparatus in FIG. 1 includes actual value means 5 for sensing the magnitude and direction of the current through the winding L. The actual value means form an actual value representing the sensed current. An embodiment of the actual value means is described in connection with FIG. 5.

The controlling apparatus in FIG. 1 also incldues desired value means 6 for forming at least one desired value I* for the current I through the winding L. An embodiment of desired value means is described in connection with FIG. 5. The controlling apparatus further includes comparison means 7 for comparing the actual value with at least one desired value for the current. The comparison means are connected to actual value means 5 for receiving actual values, to desired value means 6 for receiving desired values and to control means 4 for emitting the result of the comparison between actual and desired values.

According to FIG. 1 the controlling apparatus also includes time interval setting means or time synchronization means 8 connected to the control means. The task of the time interval or time synchronizing means in the control apparatus is described in connection with FIGS. 3, 4 and 5.

Figure 2:
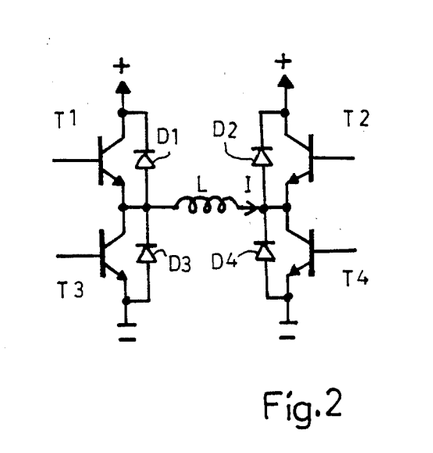
FIG. 2 illustrates a somewhat simplified drive circuit with three different types of operational state.

FIG. 2 illustrates, somewhat simplified, a known drive circuit including four transistors $T_1$, $T_2$, $T_3$ and $T_4$. Transistors $T_1$ and $T_3$ are connected in series between the positive and the negative poles of a DC source. The transistors $T_2$ and $T_4$ are also connected in series between the positive and negative poles of the DC source. The drive circuit also includes four diodes $D_1$, $D_2$, $D_3$ and $D_4$. The diode $D_1$ is connected in parallel to the transistor $T_1$. The diode $D_2$ is connected in parallel to the transistor $T_2$. The diode $D_3$ is connected in parallel to the transistor $T_3$. The diode $D_4$ is connected in parallel to the transistor $T_4$. The cathodes of the diodes $D_1$ and $D_2$ are connected to the positive pole of the DC source, while the diodes $D_3$ and $D_4$ have their anodes connected to the negative pole of the DC source. A winding L1, has one pole connected to the anode of the diode $D_1$ and the cathode of the diode $D_3$. The other pole of the winding is connected to the anode of the diode $D_2$ and the cathode of the diode $D_4$.

By controlling the transistors into different combinations of conductive and blocking states, the winding can be connected to the DC source in different ways. Different operational states can occur, depending on the magnitude and direction of the instant current through the winding and which of the transistors is/are conductive and blocking.

If instead it is assumed that the current has a given magnitude and direction according to the arrow I in FIG. 2, at least four more or less different operational states can be obtained. If the transistors $T_1$ and $T_4$ are conductive but the transistors $T_2$ and $T_3$ are blocking there is obtained an operational state where the DC source supplies electrical energy to the winding and maintains or increases the magnitude of the current. Such an operational state is of the first type.

If the transistor $T_1$ and diode $D_2$ are conductive but the transistors $T_3$ and $T_4$ are blocking there is obtained an operational state where the DC source does not supply any substantial energy to the winding and where the winding does not feed back any substantial energy to the DC source. The magnitude of the current in the direction of the arrow then decreases asymptotically towards zero, at least after a given time. Such an operational state is of the second type. If instead the transistor $T_4$ and the diode $D_3$ are conductive but the transistors $T_1$ and $T_2$ are blocking there is also obtained an operational state where the DC source does not supply any substantial energy to the winding and where the winding does not feed back any substantial energy to the source. The magnitude of the current in the direction of the arrow then decreases asymptotically towards zero, at least after a given time. With regard to the absence of energy transmission between the DC source and the winding, this operational state agrees with the one just described. It is therefore also of the second type. On the other hand, the operational state when $T_4$ and $D_3$ are conductive can naturally give a different current sequence through the winding than the operational state when $T_1$ and $D_2$ are conductive, providing that the parameter values of $T_1$ and $D_2$ differ from the corresponding parameter values of $T_4$ and $D_3$.

If instead the diodes $D_2$ and $D_3$ are conductive and the transistors $T_1$ and $T_4$ are blocking, there is obtained an operational state where energy is fed back from the winding to the energy source as long as current flows in the direction of the arrow. Such an operational state is of the third type. In this operational state the current in the direction of the arrow does not decrease asymptotically towards zero, but substantially more quickly than in the second type of operational state.

If it is assumed that the current has a given magnitude in the opposite direction to the arrow in FIG. 2, at least four more or less different operational states can be obtained. If the transistors $T_2$ and $T_3$ are conductive but $T_1$ and $T_4$ are blocking there is obtained an operational state where the DC source supplies electrical energy to the winding and increases or maintains the magnitude of the current in the opposite direction towards the arrow P. This operational state is of the first type. If the transistors $T_1$ and $T_2$ have substantially the same parameter values and the transistors $T_3$ and $T_4$ have substantially the same parameter values, the current sequence will be, apart from the direction, substantially the same as when only $T_1$ and $T_4$ are conductive and the current direction agrees with that of the arrow in FIG. 2.

If the current has a given magnitude in the opposite direction to the arrow and $T_2$ and $D_1$ are conductive but at least $T_3$ and $T_4$ are blocking there is obtained an operational state where the DC source does not supply any substantial energy to the winding and where the winding does not feed back any substantial energy to the DC source. The magnitude of the current in the opposite direction of the arrow then decreases asymptotically towards zero, at least after a given time. This operational state is of the second type. If the current has a given magnitude in the opposite direction to the arrow and instead $T_3$ and $D_4$ are conductive but at least $T_1$ and $T_2$ are blocking there is also obtained an operational state where DC source does not supply any substantial energy to the winding and where the winding does not feed back any substantial energy to the DC source. The current magnitude in the opposite direction to the arrow also decreases asymptotically towards zero in this operational state as well. This operational state is of the second type.

If the current has a given magnitude in the opposite direction to the arrow in FIG. 2 and the diodes $D_1$ and $D_4$ are conductive but the trnasistors $T_2$ and $T_3$ are blocking there is obtained an operational state where energy is fed back from the winding to the energy source as long as the current flows in a direction opposite to that of the arrow in FIG. 2. This operational state is of the third type. In this operational state the magnitude of the current in the opposite direction to the arrow does not decrease asymtotically to zero but substantially more quickly than in the second type of operational state.

In summary, the drive circuit according to FIG. 2 has at least three types of operational state. A first type of operational state which usually signifies increased current, a second type of operational state which usually signifies comparatively slowly decreasing current and a third type of operational state which usually signifies a comparatively rapid current decrease. All these three types of operational state are utilized in a method and apparatus in accordance with the invention.

Figure 3:
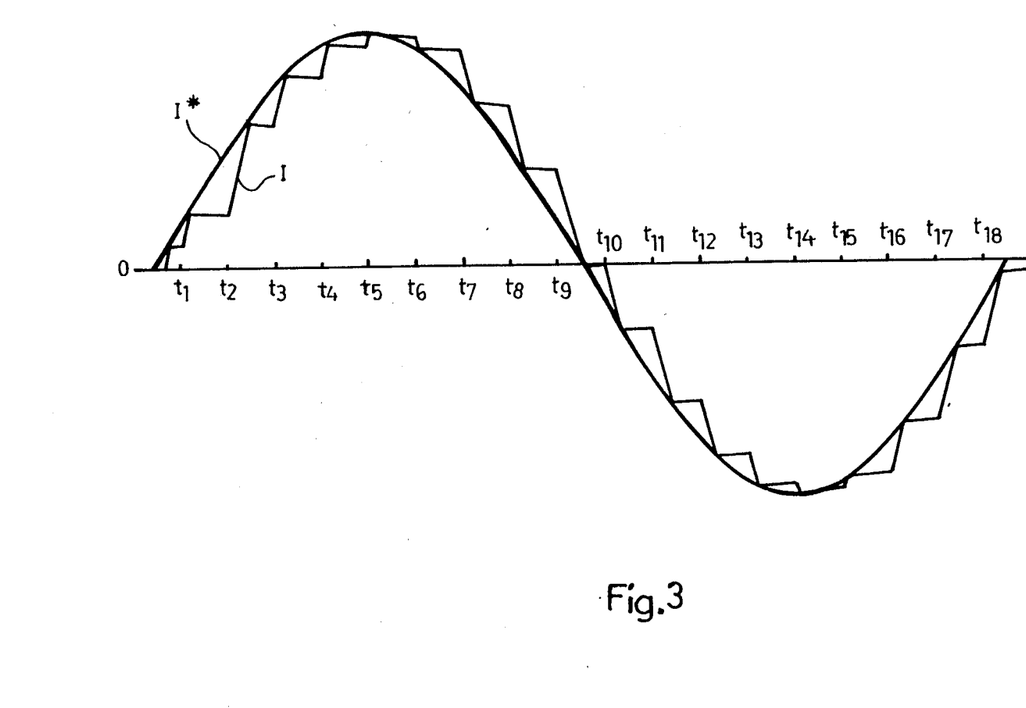
FIG. 3 illustrates a first embodiment of controlling a current towards a desired value varying sinusoidily.

A sinusoidally varying desired value I* is illustrated in FIG. 3, as well as a corresponding actual value I for a current in a first embodiment of a method and apparatus in accordance with the invention. In this embodiment the drive circuit is controlled to give different operational states in response to results of comparisons between desired and actual values in the following way.

When the drive circuit is in the first type of operational state, the drive circuit is controlled so that it maintains this state as long as the comparison shows that the current has the proper direction but its magnitude is less than the desired value. As soon as the comparison shows that the magnitude has become greater than the desired value the drive circuit is controlled to change from the first type of operational state to the second type of operational state. For controlling the circuit to change from the first type of operational state there is thus required at least one comparison between the actual value and desired value, this comparison being carried out during the time when the circuit was in the first type of operational state and showing that the actual value was greater than the desired value. The time when the circuit is controlled in appropriate cases, to change from the first type of operational state to the second type of operational state is thus not controlled by the time interval or time synchronizing means 8.

When the drive circuit is in the second type of operational state it can either be controlled to change to the first type of operational state or to the third type of operational state. The times when the drive circuit can be controlled, in appropriate cases, to change from the second type of operational state to the first or third type of operational state are determined by a time synchronizing means 8. These times, which can be called transition times, are equidistant and denoted $t_1, t_2 \ldots t_{18}$ in FIG. 3.

In order that the drive circuit shall be controlled to change from the second type of operational state to the first type of operational state at a transition time there is required either that the actual value was less than the desired value during a given time before the transition time, or that two successive comparisons with a given time spacing have both shown that the actual value was less than the desired value. Before the circuit can be controlled to change from the second type of operational state to the first type of operational state there is thus required that a comparison between an actual value and a desired value has taken place during the time when the circuit was in the second type of operational state. The drive circuit is controlled to change from the second to the first type of operational state at the transition times $t_1$-$t_5$ and $t_{10}$-$t_{14}$ shown in FIG. 3.

In order that the drive circuit shall be controlled to change from the second type of operational state to the third type of operational state at a transition time there is required either that the actual value was greater than the desired value during a given time before the transition time, or that two successive comparisons with a given time spacing have both shown that the actual value was greater than the desired value. Before the circuit can be controlled to change from the second type of operational state to the third type of operational state it is thus required that a comparison has taken place between an actual value and a desired value during the time when the circuit was in the second type of operational state. The drive circuit is controlled to change from the second to the third type of operational state at the transition times $t_6$-$t_9$ and $t_{15}$-$t_{18}$ shown in FIG. 3.

If the criteria for transition to the first or to the third type of operational state are not met with at a given transition time when the drive circuit is in the second type of operational state, the drive circuit is controlled at this transition time in FIG. 3 enter into to the type of operational state it had immediately preceding the second type of operational state. Irrespective of the comparison result, the drive circuit is thus controlled to leave from the second type of operational state at each transition time in FIG. 3.

In another embodiment, not preferred, the drive circuit can be controlled, when it is in the second type of operational state to maintain the second type of operational state instead, at least until the next transition time, if certain critera for entering into from the first or the third type are not met. This embodiment is not illustrated in any figure, however.

According to the graphs in FIG. 3, when the drive circuit is in the third type of operational state, the drive circuit is controlled so that it maintains the third type of operational state as long as the comparison shows that the actual value is greater than the desired value. As soon as the comparison shows that the current has the proper direction but the magnitude has become less than the desired value the drive circuit is controlled to change from the third type of operational state to the second type of operational state. For controlling the circuit to change from the third type of operational state there is thus required that at least one comparison between an actual value and a desired value carried out during the time when the circuit was in the third type of operational state has shown that the actual value was less than the desired value. The time when the drive circuit is controlled, in appropriate cases, to change from the third type of operational state to the second type of operational state is thus not controlled by the time interval means or time synchronizing means 8.

Figure 4:
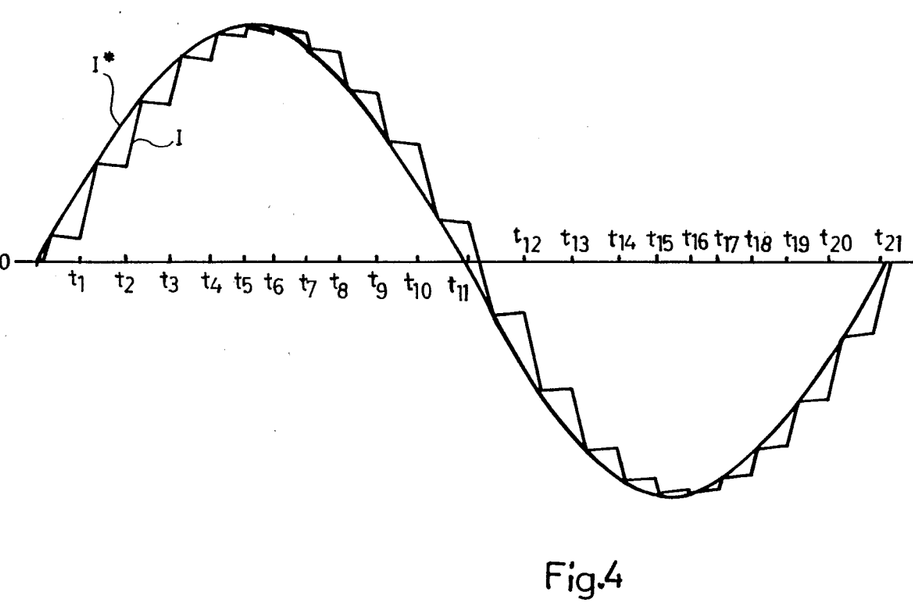
FIG. 4 illustrates another embodiment of controlling a current towards a desired value varying sinusoidily.

In FIG. 4 there is illustrated a sinusoidily varying desired value I* and the corresponding actual value I for a current in another embodiment of a method and controlling apparatus in accordance with the invention. In this embodiment the drive circuit is controlled into different types of operational state in a similar way as described in connection with FIG. 3. The transition times $t_1, t_2, \ldots t_{21}$ for possible transitions from the second type of operational state to the first or third type of operational state are, however, not equidistant as in FIG. 3. In an embodiment of a method and apparatus illustrated by FIG. 4, a substantially constant time interval $\Delta t$ is decided. The transition times $t_1, t_2, \ldots t_{21}$ are selected according to FIG. 4 so that they occur when the drive circuit has been in the second type of operational state during a continuous time substantially agreeing with an integer multiple of the time interval $\Delta t$. Apart from the selection of transition times for possible transitions from the second type of operational state, the same criteria for controlling the drive circuit into different operational states are applied, however. At the transition times $t_1-t_5$ and $t_{12}-t_{16}$ in FIG. 4 the drive circuit is thus controlled to change from the second type of operational state to the first type of operational state. At the transition times $t_6-t_{11}$ and $t_{17}-t_{21}$ in FIG. 4 the drive circuit is controlled to change from the second type of operational state to the third type of operational state. Irespective of the comparison result, the drive circuit is thus controlled to leave the second type of operational state at every transition time in FIG. 4.

In a different embodiment, not preferred, the drive circuit can be controlled to remain in the second type of operational state at a transition time, if certain criteria for transition to the first or third type of operational state have not been met. This embodiment with its time intervals is not illustrated in any figure, however. In this embodiment the drive circuit could have remained in the second type of operational state after the transmission time $t_6$ in FIG. 4.

Figure 5:
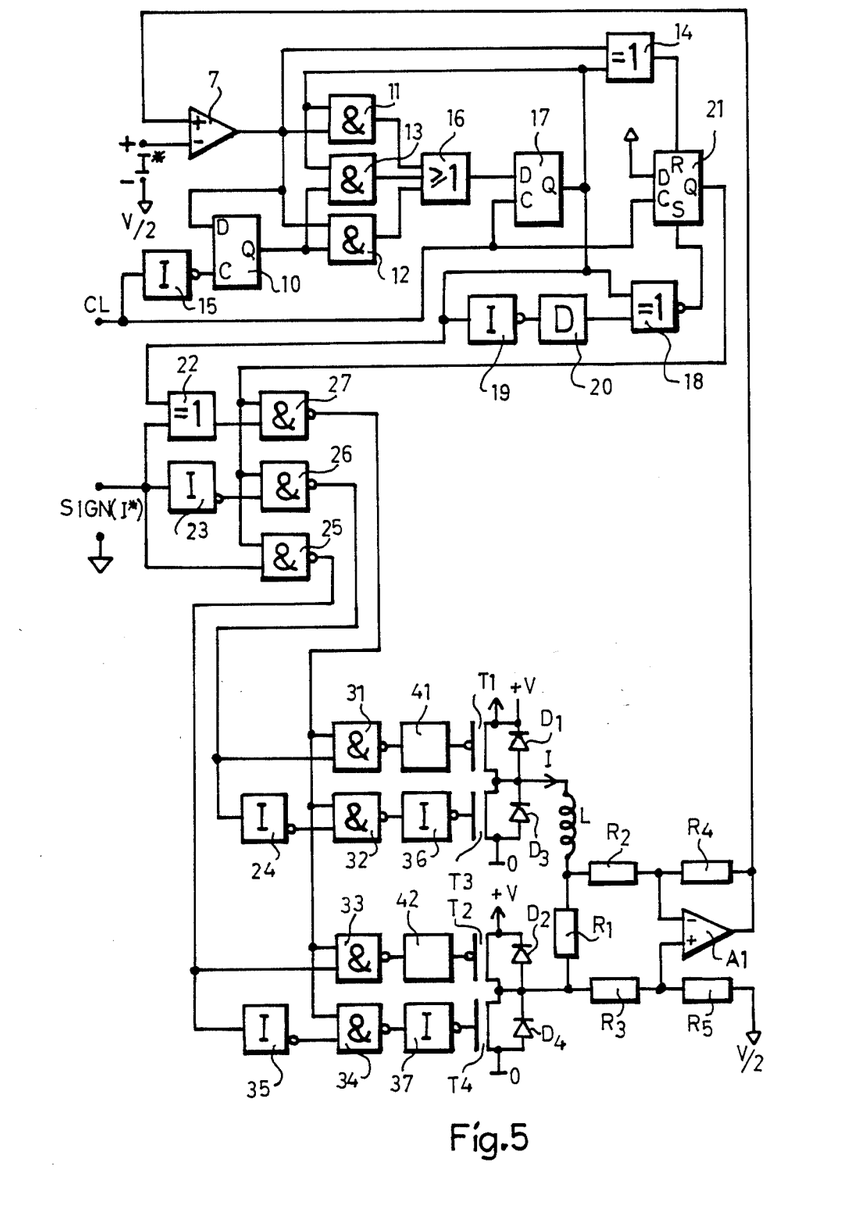
FIG. 5 illustrates, somewhat simplified, embodiments of actual value means, comparison means and control means included in a controlling apparatus in accordance with the invention.

An embodiment of a controlling apparatus with drive circuit, actual value means, comparison means and control means in accordance with the invention is illustrated in FIG. 5. The controlling apparatus has the task of controlling the magnitude and direction of the current I through the winding L towards a desired value I*. The desired value I* has a sign disclosing the desired direction through the winding and an amount indicating the desired magnitude of the current in this direction. The desired value, which can be obtained in a similar way as described in EP 0242344, is supplied to an input denoted by — in a comparison means in the form of a comparator 7 with two inputs and one output. The other input of the comparator is connected to the output of an actual value sensing means. The actual value means in FIG. 5 includes a first resistor $R_1$ connected in series with the winding L to the drive circuit $T_1, D_1, T_2, D_2, T_3, D_3, T_4$ and $D_4$. The actual value means also includes a second resistor $R_8$ and a third resistor $R_3$ with the resistance R. The actual value means further includes a fourth resistor $R_4$ and a fifth resistor $R_5$ with the resistance 2R. In addition, the actual value means includes a differential amplifier A1 with two inputs and one output. The differential amplifier A1 generates on its output a voltage varying as the current through the first resistor $R_1$. The output of the differential amplifier is connected to an input of the comparator 7. The potential on this input marked + will thus vary as the current through the winding L. When no current flows through the winding the potential on this input marked + on the comparator is just as great as half the voltage of the DC source. The greater the current is in a given direction through the winding the higher the potential on the comparator input denoted +, and the greater the current is in the opposite direction through the winding the lower will be the potential on the comparator input denoted +.

On its output the comparator generates an essentially binary signal at high level when the potential on its input denoted + is greater than the potential on its input denoted —. When the potential on the comparator input denoted + is lower than the potential on the comparator input denoted — the comparator generates on its output an essentially binary signal at low level.

The comparator output is connected to the D input of a first multivibrator 10, to one input of a first AND gate 11, to one input of a second AND gate 12 and to one input of a first EXCLUSIVE-OR gate 14. The C input of the first multivibrator is connected via a first inverter 15 to an input for square wave clock signals CL. The Q output on the first multivibrator is connected to an input of the second AND gate 12 and an input of the third AND gate 13.

The outputs of the first AND gate, the second AND gate and third AND gate are each connected to its own input on a first OR gate 16. The OR gate output is connected to the D input of a second multivibrator 17. The C input of the second multivibrator is connected directly to the input for clock signals CL. The Q output of the second multivibrator is connected to an input of the EXCLUSIVE-OR gate 14, an input of the AND gate 11 and an input of the AND gate 13. The Q output of the second multivibrator is also connected directly to one input of a first EXNOR gate 18 and via a second inverter 19 and a delaying means 20 to the second input of the first EXNOR gate 18. The output of the EXNOR gate 18 is connected to the S input of a third multivibrator 21.

The R input of the third multivibrator is connected to the output of the first EXCLUSIVE-OR gate 14. The D input of the third multivibrator is connected to the positive pole of the DC source. The C input of the third multivibrator is connected to the input for clock signals CL. The Q output of the third multivibrator is connected to an input of each of a fifth NAND gate 25, a sixth NAND gate 26 and a seventh NAND gate 27. The fifth NAND gate 25 has an input connected directly to a binary input for information as to desired current direction through the winding. The signal SIGN (I*) on this input is high for a given desired direction of the current through the winding L, and low for the reverse desired direction of the current through the winding.

The sixth NAND gate 26 has an input connected via a third inverter 23 to the input of the binary information SIGN (I*) for desired current direction through the winding. The seventh NAND gate 27 has an input connected to an output of a second EXCLUSIVE-OR gate 22, which has an input connected to the input for the information SIGN (I*) as to desired current direction. The second EXCLUSIVE-OR gate 22 also has an input connected to the Q output of the second multivibrator.

The output of the seventh gate NAND gate 27 is connected to an input of each of a first NAND gate 31, a second NAND gate 32, a third NAND gate 33 and a fourth NAND gate 34. The first NAND gate 31 also has an input connected to the output of the sixth NAND gate 26. The second NAND gate 32 has an input connected via a fourth inverter 24 to the output of the NAND gate 26. The third NAND gate 33 has an input connected to the output of the fifth NAND gate 25. The fourth NAND gate has an input connected to the output of the fifth NAND gate 25 via a fifth inverter 35.

The output of the first NAND gate 31 is connected to the control electrode of the transistor $T_1$ via a first level shifting means 41. The output of the second NAND gate 32 is connected to the control electrode of the transistor $T_3$ via a sixth inverter 36. The output of the third NAND gate 33 is connected to the control electrode of the transistor $T_2$ via a second level shifting means 42. The output of the fourth NAND gate 34 is connected to the control electrode of the transistor $T_4$ via a seventh inverter 37.

The controlling apparatus according to FIG. 5 functions in the following way. The times for transitions from the first or the third type of operational state are not dependent on the clock signals, but on the times when the output signal from the comparator changes logical level. On the other hand, the times for transitions from the second type of operational state to the first or third type of operational state are synchronized with the clock signals. Each time the drive circuit is in the second type of operational state and the clock signal changes from low to high level, the drive circuit is controlled to change from the second type of operational state to either the first or the third type of operational state. The clock signals thus determine the transition times for transitions from the second type of operational state.

The first multivibrator can change state only when the clock signals change from high to low level. With the square wave clock signals this takes place approximately in the middle between the transition times of the square wave clock signals. The logical level of the output signal from the comparator determines what state the first multivibrator assumes when the clock signals changes from high to low level. It may thus be said that the first multivibrator successively stores a result of the comparison between the actual value and a desired value at times halfway between the transition times.

The second multivibrator can change state only when the clock signals change from low to high level, i.e. at the transition times. The logical level on the output of the first OR gate 16 determines which state the second multivibrator assumes when the clock signal changes from low to high level. If both the output signal from the comparator and the Q output on the first multivibrator have high level at a transition time, the second multivibrator assumes a high level state on its Q output. If, instead, both comparator output and the first multivibrator Q output have low level at a transition time, the second multivibrator assumes a low level state on its Q output. If the comparator output has one logical level while the first multivibrator Q output has an opposite logical level at a transition time, the second multivibrator maintains the state it had before the transition time. The state of the second multivibrator thus depends indirectly on the result of previous comparisons between the current actual value and a desired current value.

The logical level on the Q output of the third multivibrator decides whether the drive circuit is controlled into the second type of operational state or not. The drive circuit shall be controlled to leave from the second type of operational state if it is in the second type of operational state when the clock signal changes from low to high level. This is achieved by the D input of the third multivibrator being connected to a high level and the C input of the third multivibrator being connected to the input for clock signals. The drive circuit shall be controlled to enter into the second type of operational state when the output of the comparator changes logical level and the drive circuit is in the first or third type of operational state. This is achieved by the R input of the third multivibrator being connected to the output of the first EXCLUSIVE-OR gate 14, the inputs of which are connected to the output of the comparator output and the Q output of the second multivibrator. In order that the Q output of the third multivibrator shall not change logical level in conjunction with solely the Q output of the second multivibrator changing logical level, the S input of the third multivibrator is connected to the Q output fo the second multivibrator via the inverter 19, delaying means 20 and EXCLUSIVE-OR gate 18. The S input of the third multivibrator is dominating over its R input, and therefore changes solely in the logical level on the Q output of the second multivibrator do not automatically chagne the state of the third multivibrator via the first EXCLUSIVE-OR gate and the R input.

In the controlling apparatus according to FIG. 5, the results of comparison between actual value and desired value for the current at the transition times and halfway between the transition times are stored. By using a clock signal with a different pulse-time relationship, the storage of results can of course take place at times which more or less deviate from being halfway between the transition times. A corresponding technique can of course be used for storing the comparison results in the embodiment having essentially constant time intervals. For example, storage can then take place approximately at the centre, and at the end, of the respective time interval.

I claim:

1. A method of controlling the magnitude and direction of a current (I) through a winding (L), which winding is connected to an electrical energy source (2) via a drive circuit (3), this drive circuit having at least three types of operational state and can be controlled to change between different types of operational states, wherein the drive circuit in a first type of operational state can supply electrical energy to the winding from the energy source, wherein the drive circuit in a second type of operational state neither supplies any substantial electrical energy to the winding from the energy source nor feeds back any substantial energy from the winding to the energy source, wherein the drive circuit in a third type of operational state does not supply any substantial electrical energy from the energy source but can feed back substantial electrical energy from the winding to the energy source, in which method the current through the winding is sensed and an actual value representing the sensed current is formed, and the actual value is compared with at least one desired value (I*) for the current, comprising the steps of:

when the drive circuit is in the first type of operational state, controlling the drive circuit such that it either maintains the first type of operational state or changes to the second type of operational state in response to the result of at least one comparison between the actual value and a desired value carried out during the time the drive circuit was in the first type of operational state;

when the drive circuit is in the third type of operational state, controlling the drive circuit such that it either maintains this state or changes to the second type of operational state in response to the result of at least one comparison between the actual value and a desired value carried out during the time the drive circuit was in the third type of operational state; and when the drive circuit is in the second type of operational state, controlling the drive circuit, in appropriate cases, so that it changes to the first or the third type of operational state only after, and in response to, the result of at least one comparison between the actual value and a desired value carried out during the time the drive circuit was in the second type of operational state.

2. A method as claimed in claim 1, wherein successive comparison results are stored, and that possible control of the drive circuit to change from the second type of operational state to the first or third type of operational state takes place in response to both a later comparison result and a previous comparison result.

3. A method as claimed in claim 2, wherein the drive circuit (3) is controlled to change from the second type of operational state to the first type of operational state if both the previous comparison result and the later comparison result have shown that the current has the proper direction but is too small, the drive circuit is controlled to change from the second type of operational state to the third type of operational state if both the previous comparison result and the later comparison result show that the current either has the wrong direction or is too great, and the circuit is controlled to change from the second type of operational state to the type of operational state it assumed immediately previously for remaining combinations of later and previous comparison results.

4. A method as claimed in claim 1, wherein a plurality of substantially equidistant transition times ($t_1, t_2, \ldots t_n$) are determined irrespective of the comparison result, and in appropriate cases the drive circuit (3) is controlled in response to the result of at least one comparison to change from the second type of operational state to the first or third type of operational state in conjunction with one of the transition times.

5. A method as claimed in claim 1, wherein a substantially constant time interval ($\Delta t$) is determined, and the drive circuit (3) is controlled in response to at least one comparison so that it changes from the second type of operational state to the first or third type of operational state when the drive circuit has been in the second type of operational state during a time substantially corresponding to an integer multiple of said time interval.

6. A method as claimed in claim 4, wherein the results of comparisons at the transition times are stored, results of comparisons made approximately halfway between the transition times are stored, and possible control of the drive circuit to change from the second type of operational state to the first or third type of operational state takes place in response to both a later comparison result and a previous comparison result.

7. A method as claimed in claim 5, wherein the results of comparisons at the termination of the time interval are stored and results of comparisons made approximately in the middle fo the time intervals are stored, and possible control of the drive circuit to change from the second type of operational state to the first or third type of operational state takes place in response to both a later comparison result and a previous comparison result.

8. A regulating apparatus for controlling the magnitude and direction of a current (I) through a winding (L), which controlling appartus comprises a drive circuit (3) for connecting the winding to an electrical energy source (2), this drive circuit having at least three types of operational state and being controllable to change between different types of operational states, which drive circuit in a first type of operational state can supply electrical energy to the winding from a connected energy source, which drive circuit in a second type of operational state neither supplies any substantial electrical energy from the energy source to the winding nor feeds back any substantial energy from the winding to the energy source, which drive circuit in a third type of operational state does not supply any substantial electrical energy from the energy source to the winding but can feed back substantial electrical energy from the winding to the energy source, said controlling apparatus including actual value means (5) for sensing the current to the winding and forming an actual value representing the sensed current, said controlling apparatus including comparison means (7) for comparing the actual value with at least one desired value (I*) for the current, said controlling apparatus including control means (4) connected to the drive circuit (3) and to the comparison means (7) for controlling the drive circuit to enter into different types of operational states in response to the result of the comparison, characterized in that when the drive circuit is in the first type of operational state the control means are adapted to control the drive circuit so that it either maintains the first type of operational state or changes to the second type of operational state in response to at least one comparison carried out by the comparison means during the time the drive circuit is in the first type of operational state, in that when the drive circuit is in the third type of operational state the control means are adapted to control the drive circuit so that it either maintains the third type of operational state or changes to the second type of operational state in response to at least one comparison carried out by the comparison means during the time the drive circuit is in the third type of operational state, and in that when the drive circuit is in the second type of operational state the control means are adapted to control the drive circuit so that it changes to the first or the third type of operational state or maintains the second type of operational state in response to at least one comparison carried out by the comparison means during the time the drive circuit is in the second type of operational state.

9. A controlling apparatus as claimed in claim 7, characterized in that it includes memory means (10) for storing successive comparison results, and in that the control means (4) is adapted such as to control the drive circuit (3), in appropriate cases, so that it changes from the second type of operational state to the first or third type of operational state in response to both a previous comparison result and a later comparison result from the comparison means.

10. A controlling apparatus as claimed in claim 7, characterized in that it includes time synchronizing means (8) for determining a plurality of substantially equidistant transition times ($t_1, t_2, \ldots t_n$) irrespective of the result of the comparison, and in that the control means (4) are adapted, in appropriate cases. to control the drive circuit (3) in response to the result of at least one comparison so that the drive circuit changes from the second type of operational state to the first or third type of operational state in conjunction with one of the transition times ($t_1, t_2, \ldots t_n$) determined by the time synchronizing means (8).

11. A controlling aparatus as claimed in claim 7, characterized in that it includes time interval means (8) for determining a substantially constant time interval ($\Delta t$), and in that the control means (4) are adapted to control the drive circuit in response to the result of at least one comparison so that the drive circuit changes from the second type of operational state to the first or third type of operational state when the drive circuit has been in the second type of operational state during a time which substantially agrees with an integer multiple of the time interval from the time interval means.

* * * * *